(12) United States Patent
Wang et al.

(10) Patent No.: US 8,477,258 B2
(45) Date of Patent: Jul. 2, 2013

(54) HIGH COLOR EXPRESSION DISPLAY DEVICE AND METHOD FOR ADJUSTING DISPLAYED COLOR

(75) Inventors: Chun-Chieh Wang, Hsin-Chu (TW);
Chun-Liang Lin, Hsin-Chu (TW);
Chen-Hsien Liao, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 669 days.

(21) Appl. No.: 12/690,217

(22) Filed: Jan. 20, 2010

(65) Prior Publication Data

US 2010/0188611 A1    Jul. 29, 2010

(30) Foreign Application Priority Data

Jan. 23, 2009 (TW) ............................... 98102990 A

(51) Int. Cl.
*G02F 1/13357* (2006.01)
*G02F 1/1335* (2006.01)

(52) U.S. Cl.
USPC ............................... 349/62; 349/68; 349/106

(58) Field of Classification Search
None
See application file for complete search history.

(56) References Cited

U.S. PATENT DOCUMENTS

| 7,068,334 | B2* | 6/2006 | Kojima et al. | 349/106 |
| 2009/0135337 | A1* | 5/2009 | Wang et al. | 349/65 |
| 2009/0180052 | A1* | 7/2009 | Hsu et al. | 349/62 |

FOREIGN PATENT DOCUMENTS

| JP | 1293303 | 11/1989 |
| JP | 2007304391 | 11/2007 |

OTHER PUBLICATIONS

English language translation of abstract of JP 1293303 (published Nov. 27, 1989).
English language translation of abstract of JP 2007304391 (published Nov. 22, 2007).

* cited by examiner

*Primary Examiner* — Michelle R Connelly
(74) *Attorney, Agent, or Firm* — McClure, Qualey & Rodack, LLP

(57) ABSTRACT

A high color expression display device and a method for adjusting the displayed color are provided. The display device includes a backlight source, a transmittance adjusting layer, and a display panel for receiving light from the backlight source. The display panel has a color filter disposed above the backlight source. A CIE standard illuminant C test result of the color filter falls into a predetermined scope. In a transmittance spectrum of the transmittance adjusting layer, an average transmittance at wavelength shorter than 495 nm is smaller than that at wavelength greater than 570 nm.

33 Claims, 6 Drawing Sheets

HIGH COLOR EXPRESSION DISPLAY DEVICE AND METHOD FOR ADJUSTING DISPLAYED COLOR

This application claims the priority based on a Taiwanese Patent Application No. 098102990, filed on Jan. 23, 2009, the disclosure of which is incorporated herein by reference in its entirety.

BACKGROUND OF THE INVENTION

1. Field of the Invention

The present invention relates to a display device and a method for adjusting the displayed color; more particularly, the present invention relates to a high color expression display device and a method for adjusting the displayed color.

2. Description of the Prior Art

Display panels and panel display devices using the display panels have become the mainstream display devices. For example, various panel displays, home flat televisions, panel monitors of personal computers and laptop computers, and display screens of mobile phones and cameras are products widely using display panels. Particularly, the market demand for liquid crystal display devices largely increases in recent years. In order to meet the function and appearance requirements of liquid crystal displays, the design of backlight modules used in liquid crystal display devices is also diverse.

In conventional, the backlight module usually uses tube lamps as the backlight source. Light emitted from the tube lamp can achieve a certain level of color rendering and color saturation. However, since the tube lamp occupies a larger space, the backlight module equipped with the tube lamp accordingly has a larger volume. Additionally, the tube lamp consumes more power resulting in low usable time for the entire system. In order to address the above problems, some backlight modules use white light emitting diodes (LEDs) as the light source. The white LED is advantageous in environmental protection, low power consumption, and small volume. However, the color expression and color saturation of the white LED still cannot match up those of the tube lamp. For example, the white LED made of a blue LED chip with yellow green phosphors usually generates small energy in the red light range causing color shift in the generated white light.

Additionally, due to material properties and production limitations of the white LED, the availability of white LEDs is restricted. As shown in FIG. 1, due to various limitations, the available or suitable white LEDs are those having coordinates fallen into the area 10 (for example, in the CIE 1931 coordinate system). However, in consideration of color saturation and expression of other colors, the practical white LEDs may be those having coordinates fallen into the area 30. Since only half of white LEDs in the area 30 will meet the limitations defined in the area 10, the other half of white LEDs are not applicable which inevitably increases the production cost.

In order to address the white color shift issue and the difficulty in selecting or manufacturing suitable white LEDs, a color filter is often employed for adjustment. However, with the addition of the color filter, the color shift, such as orange color shift or purple color shift, is readily occurred and adversely affects the color rendering. Moreover, the addition of certain settings of color filter may diminish the overall light transmittance and in turn undesirably affect the brightness.

SUMMARY OF THE INVENTION

An objective of the present invention is to provide a display device and a method for adjusting the displayed color to achieve a better color expression and maintain the overall brightness.

Another objective of the present invention is to provide a display device and a method for adjusting the displayed color, which may use white light emitting diodes (LEDs) with different color expression as a backlight source.

Another objective of the present invention is to provide a display device and a method for adjusting the displayed color to reduce the production cost.

In one embodiment, the display device includes a backlight module, a display panel, and a transmittance adjusting layer. The display panel is disposed above the backlight module and configured to receive light emitted from the backlight module so as to produce images on the display panel. The transmittance adjusting layer is disposed above the backlight source of the display module and configured to modulate the light of the backlight source.

The display panel includes a color filter layer for filtering the light of the backlight source. A result of the color filter layer under a CIE standard illuminant C test includes:

$$0.135 \leq Bx \leq 0.150;$$

$$Ry \leq 0.329; \text{ and}$$

$$Gx \leq 0.295;$$

wherein Bx is x coordinate of blue light obtained from the CIE standard illuminant C test, Ry is y coordinate of red light obtained from the CIE standard illuminant C test, Gx is x coordinate of green light obtained from the CIE standard illuminant C test.

The backlight module includes a backlight source therein. The backlight source includes a plurality of white LEDs and has an intensity spectrum exhibiting a peak value within a peak range of wavelength shorter than 495 nm being larger than that within in a peak range of wavelength greater than 570 nm. The transmittance adjusting layer has an average transmittance at wavelength being shorter than 495 nm smaller than that at wavelength greater than 570 nm. By means of the method for adjusting the displayed color, the transmittance adjusting layer is cooperated with the color filter layer to balance the weak intensity near the red light wavelength range of the backlight source, so that the entire module can have a better performance when outputting white light and prevent white color shift. Additionally, each color of the output light does not readily generate color shift, and the transmittance of light can be maintained or enhanced without affecting brightness.

DETAILED DESCRIPTION OF THE PREFERRED EMBODIMENT

The present invention provides a display device and a method for adjusting displayed color. In a preferred embodiment, the display device includes a liquid crystal display device, such as liquid crystal display televisions, liquid crystal display monitors of personal computers and laptop computers, and liquid crystal display screens of mobile phones and digital cameras.

Figure 1:
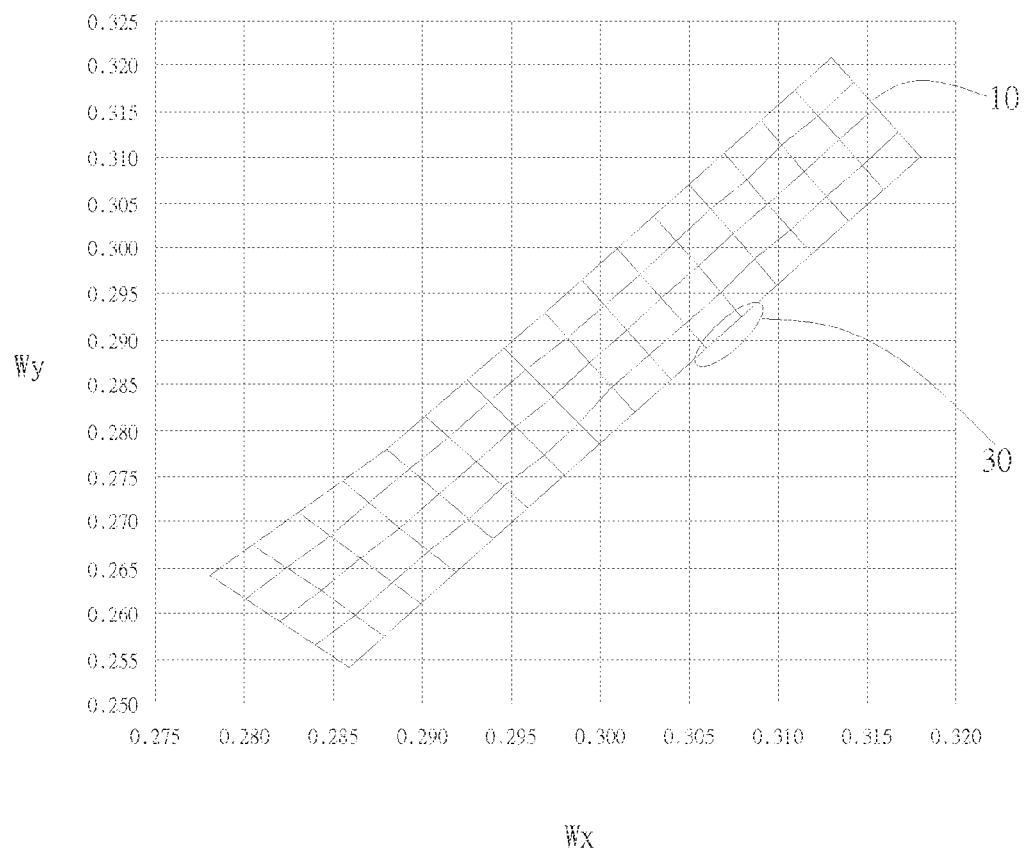
FIG. 1 illustrates a schematic chromaticity diagram of a conventional white LED.
Figure 2:
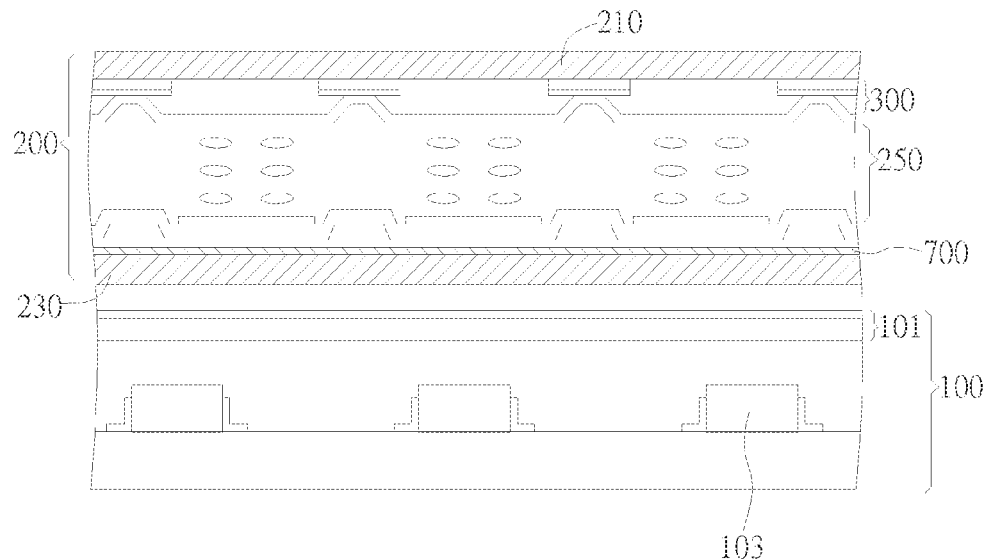
FIG. 2 illustrates a schematic cross-sectional view of a display device of the present invention.

As shown in FIG. 2, the display device preferably includes a backlight module 100, a display panel 200, and a transmittance adjusting layer 700. In this embodiment, the backlight module 100 can be a direct type backlight module; however, in a different embodiment, the backlight module 100 can include a light guide plate to form an edge type backlight module. The display panel 200 is disposed on the backlight module 100 and configured to receive lights emitted from the backlight module 100. The display panel 200 is preferably a liquid crystal display including a first substrate 210, a second substrate 230, and a liquid crystal layer 250. In this embodiment, the first substrate 210 is a substrate on the displaying side, and the second substrate 230 is a substrate on the light incident side. However, in different embodiments, the first substrate 210 and the second substrate 230 can be disposed in an opposite manner. The liquid crystal layer 250 is sandwiched between the first substrate 210 and the second substrate 230, and the behavior of liquid crystal molecules thereof is controlled by the electrodes on the first substrate 210 and the second substrate 230. By controlling the behavior of the liquid crystal molecules, the display panel 200 is capable of exhibiting different brightness at different pixels so that images to be viewed by users are formed. The transmittance adjusting layer 700 is disposed above the backlight source 103 of the backlight module 100 and configured to receive the light of the backlight source 103. In a preferred embodiment, the transmittance adjusting layer 700 is disposed within the display panel 200; however, in different embodiments. The transmittance adjusting layer 700 can be disposed outside the display panel 200 or other locations as appropriate, such as within the backlight module 100.

In the embodiment of FIG. 2, the display panel 200 includes a color filter layer 300 which is disposed on an inner surface of the first substrate 210. However, in a different embodiment, the color filter layer 300 can be disposed on the second substrate 230 or other locations above the backlight source 103 of the backlight module 100. The color filter layer 300 is selective to light of different wavelength. That is, the color filter layer 300 allows light having a wavelength within in a given range to pass therethrough and blocks light having other wavelengths so that the display panel 200 is enabled to display different images. In this embodiment, the color filter layer 300 preferably includes red, green, and blue resists, and the thickness thereof is preferably between 1.4 μm and 2.5 μm to accommodate the requirements of manufacturing processes and other elements. Moreover, the color filter layer may include resists of other color, such yellow, magenta, etc.

The optical property of the color filter layer 300 is preferably represented in accordance with the standard illuminant C test defined by the International Commission on Illumination (CIE). Standard illuminant C is a CIE standard illuminant for filtered tungsten illumination that simulates average daylight with a correlated color temperature (CCT) of 6774 degrees K. Besides directly performing the CIE standard illuminant C test, a standard illuminant A test can be performed to measure the transmittance of the color filter layer 300, and the spectrum of the CIE standard illuminant C can be then used to calculate the transmittance spectrum occurred when the illuminant C serves as the test light source. Thereafter, the chromatic value of the color filter layer 300 can be obtained. The standard illuminant A is a tungsten lamp with a color temperature 2856 degrees K.

In a preferred embodiment, the result of the color filter layer 300 under a CIE standard illuminant C test includes:

$0.135 \leq Bx \leq 0.150;$ $Ry \leq 0.329;$ and $Gx \leq 0.295,$ wherein Bx is x coordinate of blue light obtained from the CIE standard illuminant C test, Ry is y coordinate of red light obtained from the CIE standard illuminant C test, and Gx is x coordinate of green light obtained from the CIE standard illuminant C test.

In a preferred embodiment, the color filter layer 300 can be further controlled to obtain $BY \geq 16$ under the CIE standard illuminant C test, wherein BY is the transmittance of blue light. With such an arrangement, the light transmittance of the display device can be improved to increase the brightness. In a different embodiment, if the color filter layer 300 is controlled to obtain $By > 0.120$ under the CIE standard illuminant C test, a similar effect can be achieved, wherein By is y coordinate of blue light obtained from the CIE standard illuminant C test.

Figure 3:
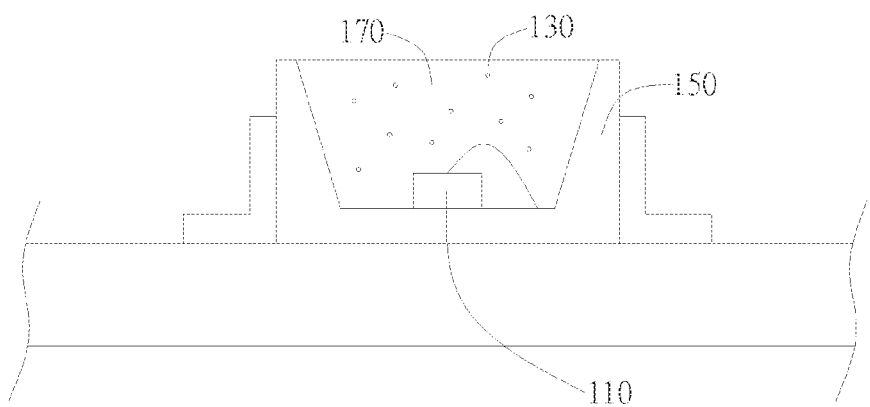
FIG. 3 is a schematic view of a backlight source in accordance with an embodiment of the present invention.

The backlight source 103 of the backlight module 100 preferably includes a white light emitting diode (LED). In the embodiment of FIG. 2, the backlight module 100 further includes an optical film 101, such as diffusion plate, diffusion sheet, brightness enhancement film, polarizing film, disposed above the backlight source 103. The backlight module 100 can also include other optical elements such as reflective sheet to be disposed corresponding to the backlight source 103 so as to improve the brightness and uniformity of the backlight module 100. As shown in FIG. 3, the white LED includes an active light source 110 and a passive light source 130. The active light source 110 can emit light upon providing a signal, while the passive light source 130 is excited by the light of the active light source 110 to generate light in another color. In this embodiment, the active light source 110 is preferably a blue LED chip, and the passive light source 130 is a non-blue phosphor, particularly a phosphor with a wavelength greater than that of the blue LED chip. When the blue LED chip emits blue light incident onto the phosphor, the phosphor is excited to generate light in different color so as to form a white light. In a preferred embodiment, the blue LED chip is used with yellow green phosphor, such as yttrium aluminum garnet (YAG) phosphor or silicate phosphor. However, in a different embodiment, it can be used with other phosphors such as red and green phosphors. In this embodiment, the phosphors are doped within the transparent body 170 of the bowel 150 of the white LED. In a different embodiment, the phosphors can be disposed (e.g. coated or adhered) at least on a partial light exit surface of the blue LED chip.

Figure 4:
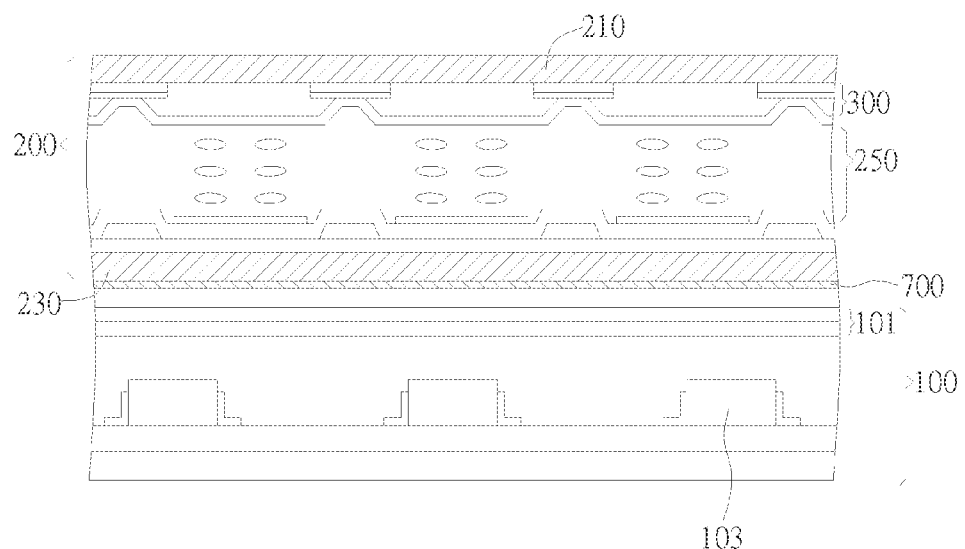
FIG. 4 is a schematic view of a transmittance adjusting layer on the outer surface of the second substrate in accordance with an embodiment of the present invention.

In the embodiment of FIG. 2, the transmittance adjusting layer 700 is disposed between the color filter layer 300 and the backlight module 100. In other words, the color filter layer 300 receives lights of the backlight module 100 through the transmittance adjusting layer 700. In this embodiment, the transmittance adjusting layer 700 is preferably disposed on the inner surface of the second substrate 230, i.e. the inner surface of the second substrate 230 is the surface facing the first substrate 210. However, in a different embodiment, as shown in FIG. 4, the transmittance adjusting layer 700 can be disposed on an outer surface of the second substrate 230, i.e. the outer surface of the second substrate 230 is the surface facing the backlight module 100. The transmittance adjusting layer 700 preferably includes a transparent dielectric layer with a refractive index different from that of the second substrate 230 or the first substrate 210. The difference in refractive index allows the transmittance adjusting layer 700 to have different average transmittances for lights in different wavelength range. The transparent dielectric layer can include a material selected from the group consisting of MgO, ZnO, $SiN_x$, $SiON_x$, $TiO2$, ZnSe, ZnS, $TaO_x$, $Al_2O_3$, $TeO_x$, ITO, $Si_2O_3$, $MgF_2$, $SiO_2$, LiF, or a combination thereof.

However, in a different embodiment, the transmittance adjusting layer 700 can be a blue light absorption layer. That is, the transmittance adjusting layer 700 can absorb a portion of blue light to achieve different average transmittances for lights in different wavelength range. In this embodiment, the blue light absorption layer can include a material selected from one of pigment and phosphor. The pigment can be selected from one of P.G.R254, P.G.R177, P.G.Y139, and P.G.Y150. The phosphor can be selected from one of YAG, $Y_2O_3$:Eu, and $Gd_3Al_5O_{12}$:$Ce_3^+$. Furthermore, the transmittance adjusting layer 700 can be formed by coating, disposition, adhering, mixing, or other chemical or physical processes as appropriate.

Figure 5:
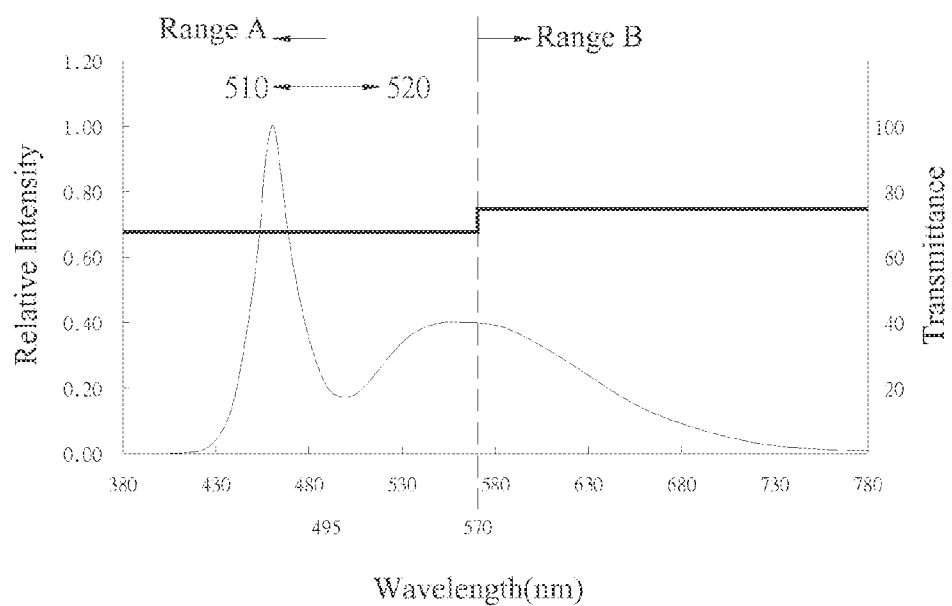
FIG. 5 is a schematic diagram showing the intensity spectrum of the backlight source and the average transmittance of the transmittance adjusting layer in accordance with an embodiment of the present invention.

FIG. 5 illustrates an intensity spectrum of the backlight source 103 and a transmittance spectrum of the transmittance adjusting layer 700. As shown in FIG. 5, when the backlight source 103 is made of a blue LED chip with yellow green phosphors, the intensity spectrum preferably exhibits a first peak range 510 and a second peak range 520, and each peak range has a peak value, which is a local maximum. For clarity, the longitudinal axis on the left of FIG. 5 represents the relative intensity. As shown in FIG. 5, the first peak range 510 is located on left side near the blue light range, preferably on the area with wavelength less than 495 nm. The second peak range 520 is located on right side near the green light and red light ranges, preferably on the area with wavelength greater than 495 nm. As shown in FIG. 5, since this embodiment uses the blue LED chip as the active light source 110 to generate blue light, which is then used to excite the passive light source 130 formed by phosphors to generate red and green lights, the intensity value in the first peak range 510 is preferably greater than that in the second peak range 520. Moreover, in the red light range with wavelength greater than 570 nm, the intensity is smaller and the peak value within this range is also smaller than that within the first peak range 510. That is, the energy in the red light range is relatively smaller compared to those in other color light range.

The traverse curve in FIG. 5 represents the average transmittance for each range by referring to the longitudinal axis on the right hand side, which represents the transmittance. As shown in FIG. 5, the transmittance adjusting layer 700 has an average transmittance at wavelength shorter than 495 nm (range A) being smaller than that at wavelength greater than 570 nm (range B). Since the transmittance curve represents the average transmittance for each range, the transmittance in each range can be adjusted. In a preferred embodiment, the average transmittance at wavelength shorter than 495 nm is smaller than that at wavelength greater than 570 nm by at least 5%. However, in a different embodiment, the difference in average transmittance is controlled to be at least 7%.

In cooperation with the transmittance adjusting layer 700 and the color filter layer 300, the weak intensity near the red light wavelength range can be balanced, so that coordinates (Wx, Wy) of the displayed light can be maintained approximate to coordinates (0.313, 0.329) of the standard white light so that the entire module can achieve a better performance when outputting the white light and prevent the white color shift issue. Additionally, each color of the displayed light does not readily generate color shift, and the transmittance of light can be maintained or enhanced without affecting the brightness.

Table 1 shows the test results on optical properties of the displayed color when the transmittance adjusting layer has a difference in average transmittance between ranges A and B to be respectively 5% and 7%, and the color filter layer 300 is the same.

TABLE 1 test results when the difference in average transmittance is 5% and 7%

| Difference in average transmittance between ranges A and B | Rx | Ry | Gx | Gy | Bx | By | Wx | Wy |
|---|---|---|---|---|---|---|---|---|
| 5% | 0.597 | 0.346 | 0.326 | 0.554 | 0.150 | 0.143 | 0.310 | 0.333 |
| 7% | 0.597 | 0.346 | 0.327 | 0.554 | 0.150 | 0.143 | 0.312 | 0.334 |

From the test results in Table 1, in both conditions (i.e. the transmittance adjusting layer has a difference in average transmittance between ranges A and B to be respectively 5% and 7%), the coordinates (Wx, Wy) of the output light are maintained appropriate to coordinates (0.313, 0.329) of the standard white light. The chromatic coordinates (Rx, Ry), (Gx, Gy), and (Bx, By) respectively for red, green, and blue colors are also within a reasonable range without color shift. Particularly, both Ry and Bx are controlled within a reasonable rage not too large.

Figure 6A:
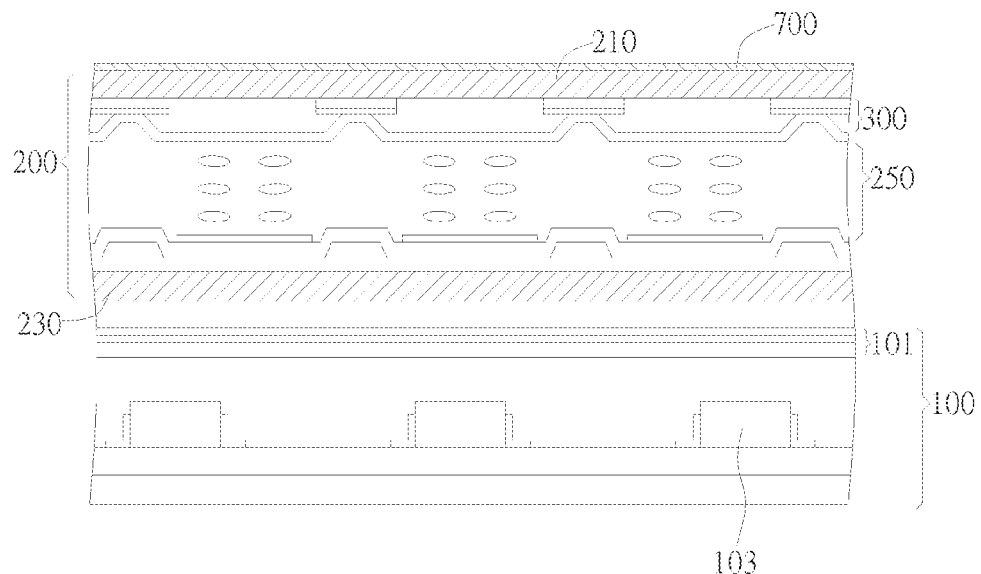
FIG. 6A is a schematic view showing the color filter disposed between the transmittance adjusting layer and the backlight module in accordance with an embodiment of the present invention.
Figure 6B:
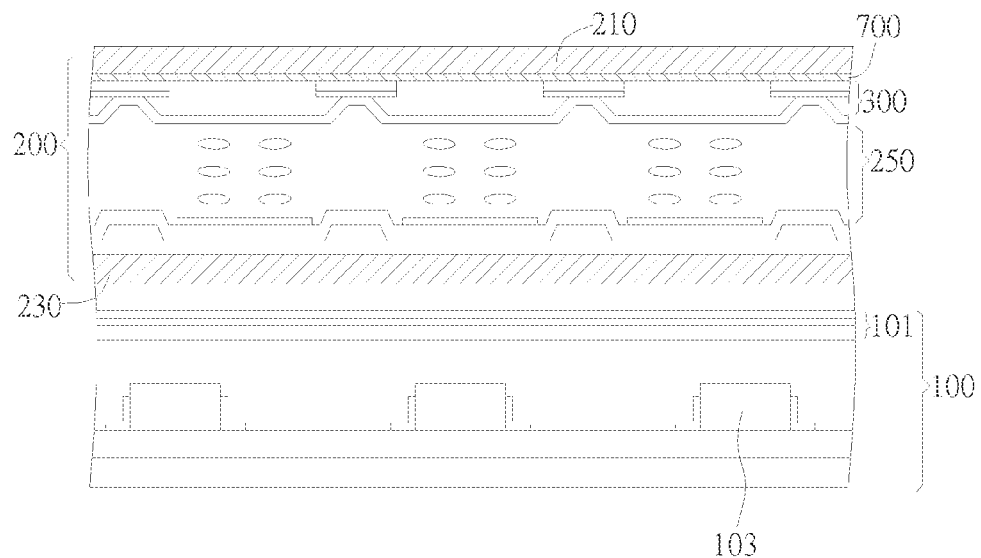
FIG. 6B is a schematic view showing the color filter disposed between the transmittance adjusting layer and the backlight module in accordance with another embodiment of the present invention.

In the embodiment of FIG. 6A, the color filter layer 300 is disposed between the transmittance adjusting layer 700 and the backlight module 100. In other words, the light of the backlight module 100 passes through the color filter layer 300 and then reaches the transmittance adjusting layer 700. In this embodiment, the transmittance adjusting layer 700 is disposed on the outer surface of the first substrate 210, i.e. the outer surface of the first substrate 210 is the surface opposite to the second substrate 230. The color filter layer 300 is disposed on the inner surface of the first substrate 210 facing the second substrate 230. However, in a different embodiment, as shown in FIG. 6B, the transmittance adjusting layer 700 and the color filter layer 300 can be sequentially stacked on the inner surface of the first substrate 210. That is, the transmittance adjusting layer 700 is disposed on the inner surface of the first substrate 210, and the color filter layer 300 is disposed on the transmittance adjusting layer 700. In the above embodiments, the transmittance adjusting layer 700 can be a transparent dielectric layer or a blue light absorption layer made of pigment or phosphor.

Figure 7:
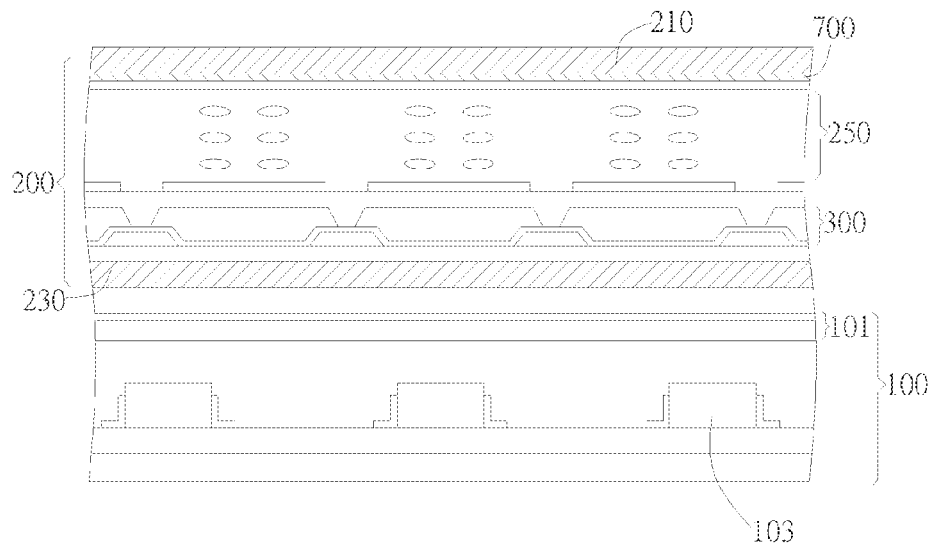
FIG. 7 is a schematic view of the color filter layer disposed on the second substrate in accordance with an embodiment of the present invention.

In another embodiment, as shown in FIG. 7, the color filter layer 300 can be formed on the inner surface of the second substrate 230, i.e. the inner surface of the second substrate 230 is the surface facing the liquid crystal layer 250, and the transmittance adjusting layer 700 can be optionally disposed on the second substrate 230 or the first substrate 210. As shown in FIG. 7, the transmittance adjusting layer 700 is formed on the inner surface of the first substrate 210; however, in different embodiments, the transmittance adjusting layer 700 can be formed on the outer surface of the first substrate 210 or the inner surface or outer surface of the second substrate 230.

Figure 8:
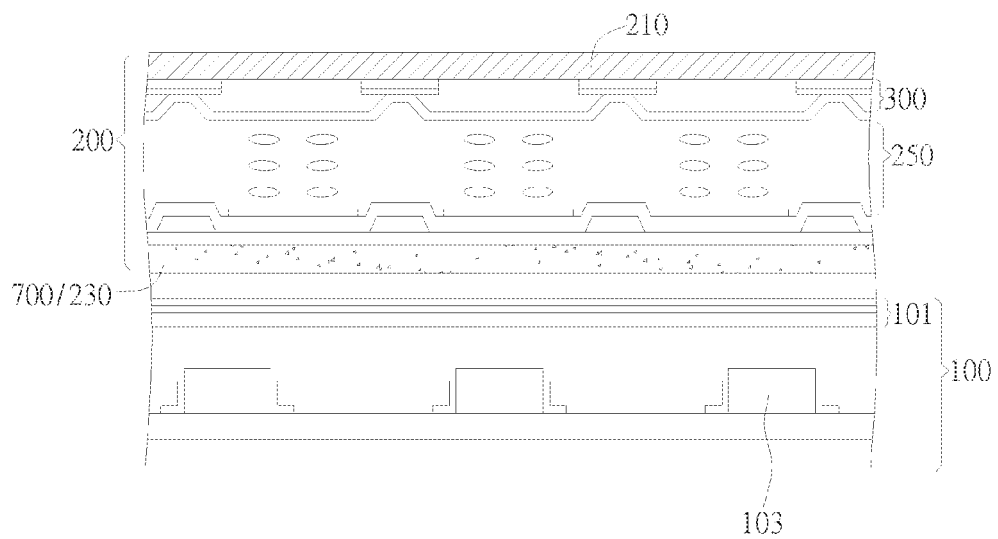
FIG. 8 is a schematic view of a transmittance adjusting layer disposed within the second substrate in accordance with an embodiment of the present invention.

In the embodiment of FIG. 8, the transmittance adjusting layer 700 can be formed within the second substrate 230. As shown in FIG. 8, the second substrate 230 is doped with pigments or phosphors to form the transmittance adjusting layer 700. In this embodiment, the light of the backlight module 100 passes through the transmittance adjusting layer 700 and then reaches the color filter layer 300. By controlling the components and concentration of the doped pigment or phosphor, the transmittance adjusting layer 700 can be modified to have different average transmittance for different wavelength range. Moreover, in a different embodiment, the transmittance adjusting layer 700 can be formed within the first substrate 210 by similar processes. In this case, the light of the backlight module 100 will pass through the color filter layer 300 and then reaches the transmittance adjusting layer 700.

Figure 9:
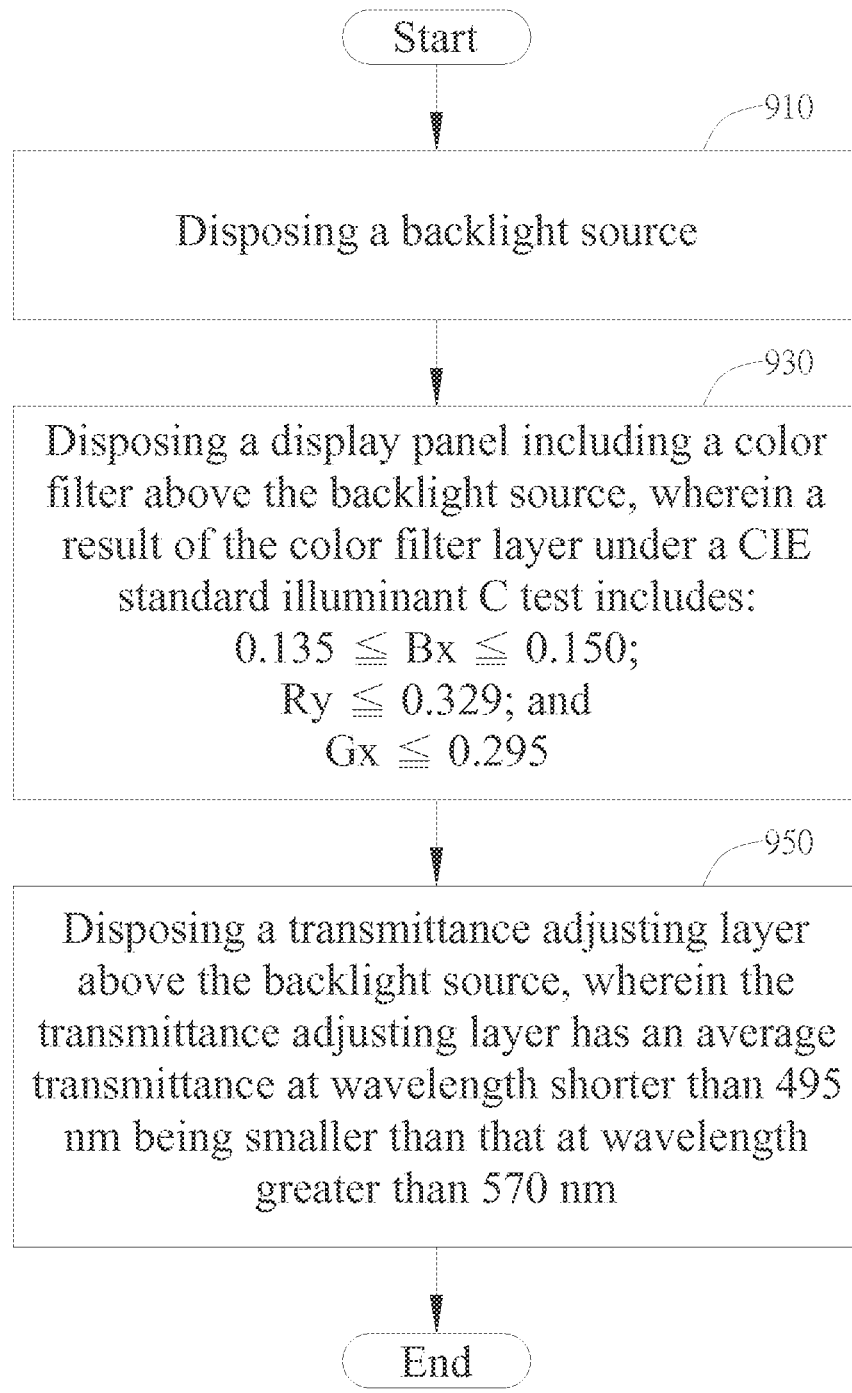
FIG. 9 is a schematic view of a method for adjusting the displayed color.

The present invention also provides a method for adjusting displayed color of a display device. In the embodiment of FIG. 9, the step 910 of the method includes disposing a backlight source. In a preferred embodiment, the backlight source has an intensity spectrum exhibiting a peak value within a peak range of wavelength shorter than 495 nm being larger than that within in a peak range of wavelength greater than 570 nm. In an embodiment, a white LED made of a blue LED chip with yellow green phosphors serves as the backlight source. For this backlight source, except the blue light, light in other colors are generated by exciting the phosphors, and therefore, the intensity thereof will be smaller than that of the blue light. In the intensity spectrum, a peak range of wavelength shorter than 495 nm is in the blue light range, and the peak value thereof of larger than that of other peak range.

Step 930 includes disposing a display panel on the backlight source. The display panel includes a color filter layer. The result of the color filter layer under a CIE standard illuminant C test includes:

$0.135 \leq Bx \leq 0.150;$ $Ry \leq 0.329;$ and $Gx \leq 0.295,$ wherein Bx is x coordinate of blue light obtained from the CIE standard illuminant C test, Ry is y coordinate of red light obtained from the CIE standard illuminant C test, and Gx is x coordinate of green light obtained from the CIE standard illuminant C test. In a preferred embodiment, by changing material of the color filter layer, the manufacturing process, the thickness of the color resists, and the component ratio of the color resists, optical properties obtained from the CIE standard illuminant C test of the color filter layer can be controlled.

Moreover, in a preferred embodiment, the color filter layer is controlled to obtain $BY \geq 16$ under the CIE standard illuminant C test, wherein BY is a transmittance of blue light. With such an adjustment, the transmittance of output light of the display device can be increased and the brightness is also enhanced.

Step 950 includes disposing a transmittance adjusting layer above the backlight source. The transmittance adjusting layer has an average transmittance at wavelength shorter than 495 nm being smaller than that at wavelength greater than 570 nm. In a preferred embodiment, the transmittance adjusting layer is controlled to have the average transmittance at wavelength shorter than 495 nm being smaller than that at wavelength greater than 570 nm by at least 5%. However, in a different embodiment, the difference in average transmittance is further controlled to be at least 7%. By modifying material, thickness, structure, mixing ratio, etc. of the transmittance adjusting layer, the difference can be adequately adjusted. Furthermore, the transmittance adjusting layer can be formed by coating, disposition, adhering, mixing, or other chemical or physical processes as appropriate.

In this step, the transmittance adjusting layer can be disposed between the color filter layer and the backlight source so that the color filter receives the light of the backlight source through the transmittance adjusting layer. In a preferred embodiment, when the color filter layer is disposed on the inner surface of a first substrate of the display device, the transmittance adjusting layer can be disposed on the inner surface or the outer surface of a second substrate of the display panel. Furthermore, the transmittance adjusting layer can be disposed on the color filter layer. Moreover, the color filter layer can be disposed on the inner surface of the second substrate, and the transmittance adjusting layer is disposed on the outer surface of the second substrate.

However, in another embodiment, when the color filter layer is disposed between the transmittance adjusting layer and the backlight source, the transmittance adjusting layer can be disposed on the outer surface or the inner surface of the first substrate, so that the color filter is disposed on the second substrate. Moreover, the color filter layer and the transmittance adjusting layer can be sequentially stacked on the inner surface of the second substrate. Furthermore, when the transmittance adjusting layer is disposed on the outer surface of the first substrate, the color filter layer can be disposed on the inner surface of the first substrate.

Furthermore, the step 950 further includes forming a transparent dielectric layer to serve as the transmittance adjusting layer. The transparent dielectric layer has a refractive index different from that of the first substrate or the second substrate. The difference in refractive index allows the transmittance adjusting layer to have different average transmittances for lights in different wavelength range. The transparent dielectric layer can include a material selected from the group consisting of MgO, ZnO, $SiN_x$, $SiON_x$, TiO2, ZnSe, ZnS, $TaO_x$, $Al_2O_3$, $TeO_x$, ITO, $Si_2O_3$, $MgF_2$, $SiO_2$, LiF, or a combination thereof.

However, in a different embodiment, the step 950 can include forming a blue light absorption layer to serve as the transmittance adjusting layer. That is, the transmittance adjusting layer can absorb a portion of blue light to achieve different average transmittances for lights in different wavelength range. In this embodiment, the blue light absorption layer can include a material selected from one of pigment and phosphor. The pigment can be selected from one of P.G.R254, P.G.R177, P.G.Y139, and P.G.Y150. The phosphor can be selected from one of YAG, $Y_2O_3$:Eu, and $Gd_3Al_5O_{12}$:$Ce_3^+$.

In a different embodiment, the step 950 can further includes disposing the transmittance adjusting layer within the second substrate. In this embodiment, the second substrate is preferably mixed with the blue light absorption material, such as pigment or phosphor, and the second substrate is then shaped for subsequent processes. By controlling the component ratio and concentration of the pigment or phosphor within the second substrate, the transmittance adjusting layer can be modified to have different average transmittance for different wavelength range. Moreover, the internal property of the second substrate can be modified by laser or other manners, so as to form the transmittance adjusting layer within the second substrate.

The present invention has been described through the relevant embodiments above; however, the embodiments above are only exemplary. What needs to point out is that the embodiments disclosed are not intended to limit the scope of the present invention. Contrarily, the modifications and the equivalents included in the spirit and scope of the claims are all included in the scope of this invention.

What is claimed is:

1. A display device, comprising:
   a backlight source including a plurality of white light emitting diodes;
   a display panel for receiving light from the backlight source, wherein the display panel includes a color filter layer, disposed above the backlight source, for filtering the light of the backlight source, a result of the color filter layer under a CIE standard illuminant C test including:

$0.135 \leq Bx \leq 0.150$;

$BY \geq 16$;

$Ry \leq 0.329$; and $Gx \leq 0.295$, wherein Bx is x coordinate of blue light obtained from the CIE standard illuminant C test, Ry is y coordinate of red light obtained from the CIE standard illuminant C test, Gx is x coordinate of green light obtained from the CIE standard illuminant C test, BY is a transmittance of blue light; and
   a transmittance adjusting layer, disposed above the backlight source, for receiving the light of the backlight source, wherein the transmittance adjusting layer has an average transmittance at wavelength shorter than 495 nm being smaller than that at wavelength greater than 570 nm.

2. The display device of claim 1, wherein the transmittance adjusting layer has the average transmittance at wavelength shorter than 495 nm being smaller than that at wavelength greater than 570 nm by at least 5%.

3. The display device of claim 2, wherein the transmittance adjusting layer has the average transmittance at wavelength shorter than 495 nm smaller than that at wavelength greater than 570 nm by at least 7%.

4. The display device of claim 1, wherein the backlight source is a dual-wavelength light source.

5. The display device of claim 1, wherein the transmittance adjusting layer is disposed between the color filter layer and the backlight source, and the color filter receives the light of the backlight source through the transmittance adjusting layer.

6. The display device of claim 5, wherein the display panel includes a first substrate and a second substrate disposed opposite to each other, the transmittance adjusting layer is disposed on an inner surface of the second substrate facing the first substrate.

7. The display device of claim 5, wherein the display panel includes a first substrate and a second substrate disposed opposite to each other, the transmittance adjusting layer is disposed on an outer surface of the second substrate opposite to the first substrate.

8. The display device of claim 5, wherein the display panel includes a first substrate and a second substrate disposed opposite to each other, the transmittance adjusting layer is formed within the second substrate.

9. The display device of claim 8, wherein the second substrate is mixed with a blue light absorption material to from the transmittance adjusting layer.

10. The display device of claim 1, wherein the color filter layer is disposed between the transmittance adjusting layer and the backlight source, the transmittance adjusting layer receives the light of the backlight source through the color filter layer.

11. The display device of claim 10, wherein the display panel includes a first substrate and a second substrate disposed opposite to each other, the transmittance adjusting layer is disposed on an outer surface of the first substrate opposite to the second substrate, and the color filter layer is disposed on an inner surface of the first substrate facing the second substrate.

12. The display device of claim 1, wherein the transmittance adjusting layer is a transparent dielectric layer with a refractive index different from that of a substrate of the display panel.

13. The display device of claim 12, wherein the transparent dielectric layer includes a material selected from the group consisting of MgO, ZnO, $SiN_x$, $SiON_x$, TiO2, ZnSe, ZnS, $TaO_x$, $Al_2O_3$, $TeO_x$, ITO, $Si_2O_3$, $MgF_2$, $SiO_2$, LiF, or a combination thereof.

14. The display device of claim 1, wherein the transmittance adjusting layer is a blue light absorption layer.

15. The display device of claim 14, wherein the blue light absorption layer includes a material selected from one of pigment and phosphor.

16. The display device of claim 15, wherein the pigment is selected from one of P.G.R254, P.G.R177, P.G.Y139, and P.G.Y150.

17. The display device of claim 15, wherein the phosphor is selected from one of YAG, $Y_2O_3$:Eu, and $Gd_3Al_5O_{12}$:$Ce_3^+$.

18. A method for adjusting displayed color of a display device, comprising:
   disposing a backlight source;
   disposing a display panel for receiving light from the backlight source, wherein the display panel includes a color filter layer, disposed above the backlight source, for filtering the light of the backlight source, a result of the color filter layer under a CIE standard illuminant C test including:

$0.135 \leq Bx \leq 0.150$;

$BY \geq 16$;

$Ry \leq 0.329$; and $Gx \leq 0.295$, wherein Bx is x coordinate of blue light obtained from the CIE standard illuminant C test, Ry is y coordinate of red light obtained from the CIE standard illuminant C test, Gx is x coordinate of green light obtained from the CIE standard illuminant C test, BY is a transmittance of blue light; and
   disposing a transmittance adjusting layer above the backlight source to receive the light of the backlight source, wherein the transmittance adjusting layer has an average transmittance at wavelength shorter than 495 nm being smaller than that at wavelength greater than 570 nm.

19. The method of claim 18, wherein the step of disposing the transmittance adjusting layer includes controlling the transmittance adjusting layer to have the average transmittance at wavelength shorter than 495 nm being smaller than that at wavelength greater than 570 nm by at least 5%.

20. The method of claim 18, wherein the step of disposing the transmittance adjusting layer includes disposing the transmittance adjusting layer between the color filter layer and the backlight source so that the color filter receives the light of the backlight source through the transmittance adjusting layer.

21. The method of claim 20, wherein the step of disposing the transmittance adjusting layer includes disposing the transmittance adjusting layer on an inner surface of a second substrate of the display panel.

22. The method of claim 20, wherein the step of disposing the transmittance adjusting layer includes disposing the transmittance adjusting layer on an outer surface of a second substrate of the display panel.

23. The method of claim 20, wherein the step of disposing the transmittance adjusting layer includes disposing the transmittance adjusting layer within a second substrate.

24. The method of claim 23, wherein the step of disposing the transmittance adjusting layer includes mixing a blue light absorption material within the second substrate to from the transmittance adjusting layer.

25. The method of claim 18, wherein the transmittance adjusting layer is disposed in a manner that the color filter layer is between the transmittance adjusting layer and the backlight source, and the transmittance adjusting layer receives the light of the backlight source through the color filter layer.

26. The method of claim 25, wherein the display panel is disposed in a manner that the color filter layer is disposed on an inner surface of a first substrate of the display panel, and the step of disposing the transmittance adjusting layer includes disposing the transmittance adjusting layer on an outer surface of the first substrate.

27. The method of claim 18, wherein the step of disposing the transmittance adjusting layer includes forming a transparent dielectric layer with a refractive index different from that of a substrate of the display panel.

28. The method of claim 27, wherein the transparent dielectric layer includes a material selected from the group consisting of MgO, ZnO, $SiN_x$, $SiON_x$, TiO2, ZnSe, ZnS, TaOx, $Al_2O_3$, $TeO_x$, ITO, $Si_2O_3$, $MgF_2$, $SiO_2$, LiF, or a combination thereof.

29. The method of claim 18, wherein the step of disposing the transmittance adjusting layer includes forming a blue light absorption layer.

30. The method of claim 29, wherein the blue light absorption layer includes a material selected from one of pigment and phosphor.

31. The method of claim 30, wherein the pigment is selected from one of P.G.R254, P.G.R177, P.G.Y139, and P.G.Y150.

32. The method of claim 30, wherein the phosphor is selected from one of YAG, $Y_2O_3$:Eu, and $Gd_3Al_5O_{12}$:$Ce_3^+$.

33. The method of claim 18, wherein the step of disposing the backlight source includes controlling the backlight source to have an intensity spectrum exhibiting a peak value within a peak range of wavelength shorter than 495 nm being larger than that within in a peak range of wavelength greater than 570 nm.

* * * * *